United States Patent
Lyakhov et al.

(10) Patent No.: US 12,248,358 B2
(45) Date of Patent: *Mar. 11, 2025

(54) EFFICIENT SYSTEM ON CHIP POWER DELIVERY WITH ADAPTIVE VOLTAGE HEADROOM CONTROL

(71) Applicant: Microsoft Technology Licensing, LLC, Redmond, WA (US)

(72) Inventors: Alexander Lyakhov, Portland, OR (US); Piyush Abhay Hatolkar, Hillsboro, OR (US); Anant Shankar Deval, Redmond, WA (US); Juan Pablo Munoz Constantine, Hillsboro, OR (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/544,096

(22) Filed: Dec. 18, 2023

(65) Prior Publication Data

US 2024/0152200 A1   May 9, 2024

Related U.S. Application Data

(63) Continuation of application No. 17/845,677, filed on Jun. 21, 2022, now Pat. No. 11,886,275.

(51) Int. Cl.
| | |
|---|---|
| *G06F 1/3296* | (2019.01) |
| *G06F 1/28* | (2006.01) |
| *G06F 1/30* | (2006.01) |
| *G06F 1/324* | (2019.01) |

(52) U.S. Cl.
CPC ............ *G06F 1/3296* (2013.01); *G06F 1/324* (2013.01)

(58) Field of Classification Search
CPC ....... G06F 1/3296; G06F 1/324; G06F 1/3203
See application file for complete search history.

(56) References Cited

U.S. PATENT DOCUMENTS

2011/0291630 A1* 12/2011 Konstadinidis ....... H02M 3/157
                                                                    323/283
2017/0344102 A1* 11/2017 Kolla ...................... H02M 1/08

* cited by examiner

*Primary Examiner* — Phil K Nguyen
*Assistant Examiner* — Gayathri Sampath
(74) *Attorney, Agent, or Firm* — Ranjeev Singh; Singh Law, PLLC (57) ABSTRACT

Systems and methods related to efficient system on chip (SoC) power delivery with adaptive voltage headroom control are described. A method for adaptively controlling voltage headroom for a system includes, in response to either a detection of a headroom violation by a per core voltage regulator headroom monitor or a detection of a voltage droop by a per core droop detector, independently throttle operating frequency of a respective core clock signal. The method further includes, in response to meeting a predetermined criterion: (1) lowering the operating frequency of the respective core clock signal, (2) monitoring headroom violation events and droop events at the lowered operating frequency, and (3) if monitored headroom violation events or monitored droop events continue to meet the predetermined criterion, changing the voltage set point associated with the motherboard voltage regulator to a second voltage set point corresponding to a higher voltage.

20 Claims, 6 Drawing Sheets

610: IN RESPONSE TO EITHER A DETECTION OF A HEADROOM VIOLATION BY A PER CORE VOLTAGE REGULATOR HEADROOM MONITOR OR A DETECTION OF A VOLTAGE DROOP BY A PER CORE DROOP DETECTOR, INDEPENDENTLY THROTTLING OPERATING FREQUENCY OF A RESPECTIVE CORE CLOCK SIGNAL

620: IN RESPONSE TO EITHER HEADROOM VIOLATION EVENTS OR DROOP EVENTS MEETING A PREDETERMINED CRITERION: (1) LOWERING THE OPERATING FREQUENCY OF THE RESPECTIVE CORE CLOCK SIGNAL TO A LOWERED OPERATING FREQUENCY, (2) MONITORING HEADROOM VIOLATION EVENTS AND DROOP EVENTS AT THE LOWERED OPERATING FREQUENCY, AND (3) IF MONITORED HEADROOM VIOLATION EVENTS OR MONITORED DROOP EVENTS CONTINUE TO MEET THE PREDETERMINED CRITERION EVEN AT THE LOWERED OPERATING FREQUENCY, CHANGING THE VOLTAGE SET POINT ASSOCIATED WITH A VOLTAGE REGULATOR MODULE (VRM) TO A SECOND VOLTAGE SET POINT CORRESPONDING TO A HIGHER VOLTAGE

# EFFICIENT SYSTEM ON CHIP POWER DELIVERY WITH ADAPTIVE VOLTAGE HEADROOM CONTROL

CROSS-REFERENCE TO RELATED APPLICATION(S)

This application is a continuation of U.S. patent application Ser. No. 17/845,677, filed on Jun. 21, 2022, entitled "EFFICIENT SYSTEM ON CHIP POWER DELIVERY WITH ADAPTIVE VOLTAGE HEADROOM CONTROL," the entire contents of which are hereby incorporated herein by reference.

BACKGROUND

Power delivery apparatuses for systems on chip (SoC) devices include voltage regulators (e.g., motherboard voltage regulators) for powering the transistors or other semiconductor devices in the SoC devices. Practical physical restrictions as well as cost optimization requirements impose a low limit on the electrical impedance between the motherboard voltage regulator and the SoC transistors. Traditional power delivery apparatuses attempt to guarantee sufficient voltage headroom at the transistor level for the entire range of SoC load current and current transients. The conventional way to guarantee sufficient voltage headroom at the transistor level has been to set the voltage regulator voltage high enough to not violate the minimum voltage requirements at any load. While such conventional power delivery apparatuses may guarantee sufficient voltage headroom, setting the voltage regulator to provide a high enough voltage to not violate the minimum voltage requirements at any load results in avoidable power losses.

Accordingly, there is a need for improvements to SoC power delivery systems and methods.

SUMMARY

In one example, the present disclosure relates to a system including a system-on-chip (SoC) including a plurality of cores. The system may further include a voltage regulator module (VRM), which is based on a voltage set point associated with the VRM, configured to provide an input voltage to each of per core voltage regulators in the SoC, where each of the per core voltage regulators is configured to provide an output voltage to a corresponding core from among the plurality of cores. The system may further include an adaptive voltage headroom control apparatus including: (1) a voltage controller for controlling the voltage set point associated with the VRM, (2) a per core voltage regulator headroom monitor, (3) a per core droop detector, and (4) a per core frequency controller configured to control a frequency of a core clock signal for a respective core from among the plurality of cores.

The adaptive voltage headroom control apparatus may be configured to, in response to either a detection of a headroom violation by the per core voltage regulator headroom monitor or a detection of a voltage droop by the per core droop detector, independently throttle operating frequency of a respective core clock signal. The adaptive voltage headroom control apparatus may further be configured to in response to either headroom violation events or droop events meeting a predetermined criterion: (1) lower the operating frequency of the respective core clock signal to a lowered operating frequency, (2) monitor headroom violation events and droop events at the lowered operating frequency, and (3) if monitored headroom violation events or monitored droop events continue to meet the predetermined criterion even at the lowered operating frequency, change the voltage set point associated with the VRM to a second voltage set point corresponding to a higher voltage.

In another example, the present disclosure relates to a method for adaptively controlling voltage headroom for a system comprising: (1) a system-on-chip (SoC) including a plurality of cores, and (2) a voltage regulator module (VRM), which is based on a voltage set point associated with the VRM, configured to provide an input voltage to each of per core voltage regulators in the SoC, where each of the per core voltage regulators is configured to provide an output voltage to a corresponding core from among the plurality of cores. The method may include, in response to either a detection of a headroom violation by a per core voltage regulator headroom monitor or a detection of a voltage droop by a per core droop detector, independently throttle operating frequency of a respective core clock signal.

The method may further include, in response to either headroom violation events or droop events meeting a predetermined criterion: (1) lowering the operating frequency of the respective core clock signal to a lowered operating frequency, (2) monitoring headroom violation events and droop events at the lowered operating frequency, and (3) if monitored headroom violation events or monitored droop events continue to meet the predetermined criterion even at the lowered operating frequency, changing the voltage set point associated with the VRM to a second voltage set point corresponding to a higher voltage.

In yet another example, the present disclosure relates to a system including a system-on-chip (SoC) including a plurality of cores. The system may further include a voltage regulator module (VRM), which is based on a voltage set point associated with the VRM, configured to provide an input voltage to each of per core low-dropout (LDO) voltage regulators in the SoC, where each of the per core LDO voltage regulators is configured to provide an output voltage to a corresponding core from among the plurality of cores. The system may further include an adaptive voltage headroom control apparatus including: (1) a voltage controller for controlling the voltage set point associated with the VRM, (2) a per core LDO voltage regulator headroom monitor, (3) a per core droop detector, and (4) a per core frequency controller configured to control a frequency of a core clock signal for a respective core from among the plurality of cores.

The adaptive voltage headroom control apparatus may be configured to, in response to either a detection of a headroom violation by the per core LDO voltage regulator headroom monitor or a detection of a voltage droop by the per core droop detector, independently throttle operating frequency of a respective core clock signal. The adaptive voltage headroom control apparatus may further be configured to in response to either headroom violation events or droop events meeting a predetermined criterion: (1) lower the operating frequency of the respective core clock signal to a lowered operating frequency, (2) monitor headroom violation events and droop events at the lowered operating frequency, and (3) if monitored headroom violation events or monitored droop events continue to meet the predetermined criterion even at the lowered operating frequency, change the voltage set point associated with the VRM to a second voltage set point corresponding to a higher voltage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to efficient system on chip (SoC) power delivery with adaptive voltage headroom control. As explained earlier, traditional power delivery apparatuses attempt to guarantee sufficient voltage headroom at the transistor level for the entire range of SoC load currents and current transients. In other words, the conventional way to guarantee sufficient voltage headroom at the transistor level has been to set the voltage regulator voltage high enough to not violate the minimum voltage requirements at any load. While such conventional power delivery apparatuses may guarantee sufficient voltage headroom, setting the voltage regulator to provide a high enough voltage to not violate the minimum voltage requirements at any load results in avoidable power losses.

While the reduction of voltage guard band allows substantial power savings, it can also create insufficient voltage conditions when the system on chip (SoC) current consumption unpredictably and rapidly increases. In this case the voltage at the SoC side may momentarily droop below the minimum allowed level and cause potential SoC malfunction. To address such potential SoC malfunction, additional mechanisms are built to guarantee safe operation of the SoC during such events. Example mechanisms include distributed per voltage regulator headroom monitors and droop detectors, per core adaptive clocking scheme, per core performance monitors that log the droop and headroom violation events, an alert system and a voltage controller that closes the control loop. The distributed adaptive clocking scheme described herein allows independent fast frequency throttling of an impacted core in response to a low-dropout (LDO) regulator input voltage headroom violation event or an LDO regulator output voltage droop event. The fast detectors with the rate of voltage change sensitivity trigger frequency throttling, which results in droop reduction and prevents violation of the core frequency-voltage operating point. The detected events get recorded and reported to the motherboard voltage regulator (MBVR) voltage controller that adjusts the MBVR set point to reduce the probability of recurrence of such events.

Figure 1:
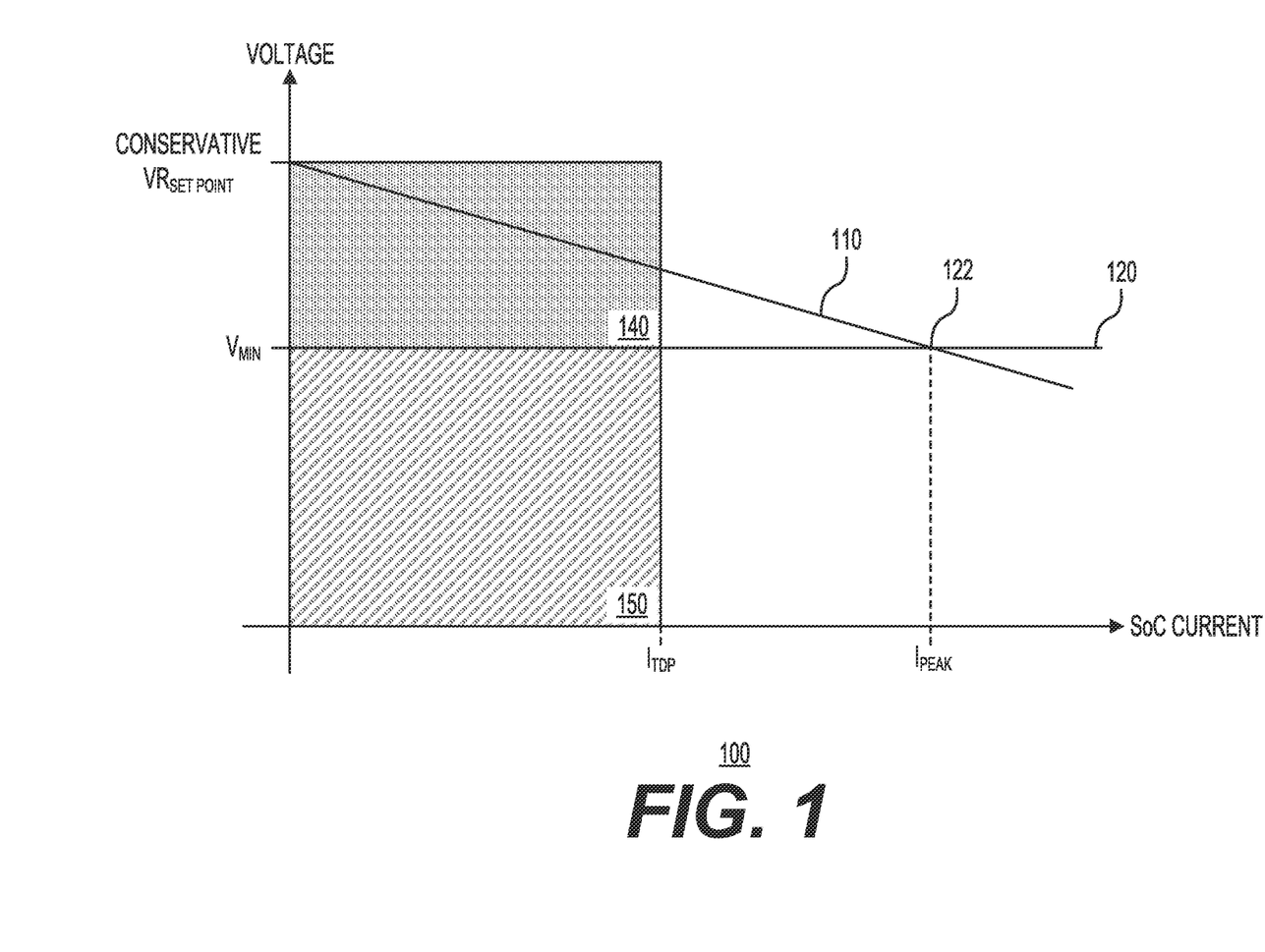
FIG. 1 shows a diagram illustrating the power loss when the voltage regulator set point ($VR_{SET\ POINT}$) is set at a conservative $VR_{SET\ POINT}$ in accordance with one example.

FIG. 1 shows a diagram 100 illustrating the power loss when the voltage regulator set point ($VR_{SET\ POINT}$) is set at a conservative $VR_{SET\ POINT}$. The vertical axis of diagram 100 represents voltage and the horizontal axis represents current (e.g., the current being drawn by a system on chip (SoC)). In this example, curve 110 represents the input voltage to the regulator (e.g., a low-dropout (LDO) regulator) and curve 120 represents the output voltage of the regulator (e.g., an LDO regulator). In this example, $I_{TDP}$ corresponds to the current drawn by the SoC at the thermal design power point. This current corresponds to the maximum amount of current that the SoC may draw given cooling constraints related to the heating of the SoC with an increased amount of current draw. In this example, $I_{PEAK}$ corresponds to the peak current that the SoC may draw. As shown in diagram 100, as the current drawn by the SoC increases, the output voltage of the regulator (represented by curve 120) drops. To guarantee that the output voltage of the regulator never drops below the minimum voltage ($V_{MIN}$) required at the peak current ($I_{PEAK}$), the regulator is configured such that curve 110 (corresponding to the input voltage of the regulator) and curve 120 (corresponding to the output voltage of the regulator) intersect at point 122 shown in diagram 100. This ensures that the headroom (the difference between the input voltage of the regulator and the output voltage of the regulator) is equal to or greater (e.g., by a few millivolts) than zero at point 122. Ensuring the headroom per diagram 100, however, results in power loss 140 relative to actual compute power 150 used by the SoC. In this case, the power loss 140 is the voltage for the conservative $VR_{SET\ POINT}$ minus the minimum voltage ($V_{MIN}$) required at the peak current ($I_{PEAK}$) multiplied by the current drawn by the SoC.

Figure 2:
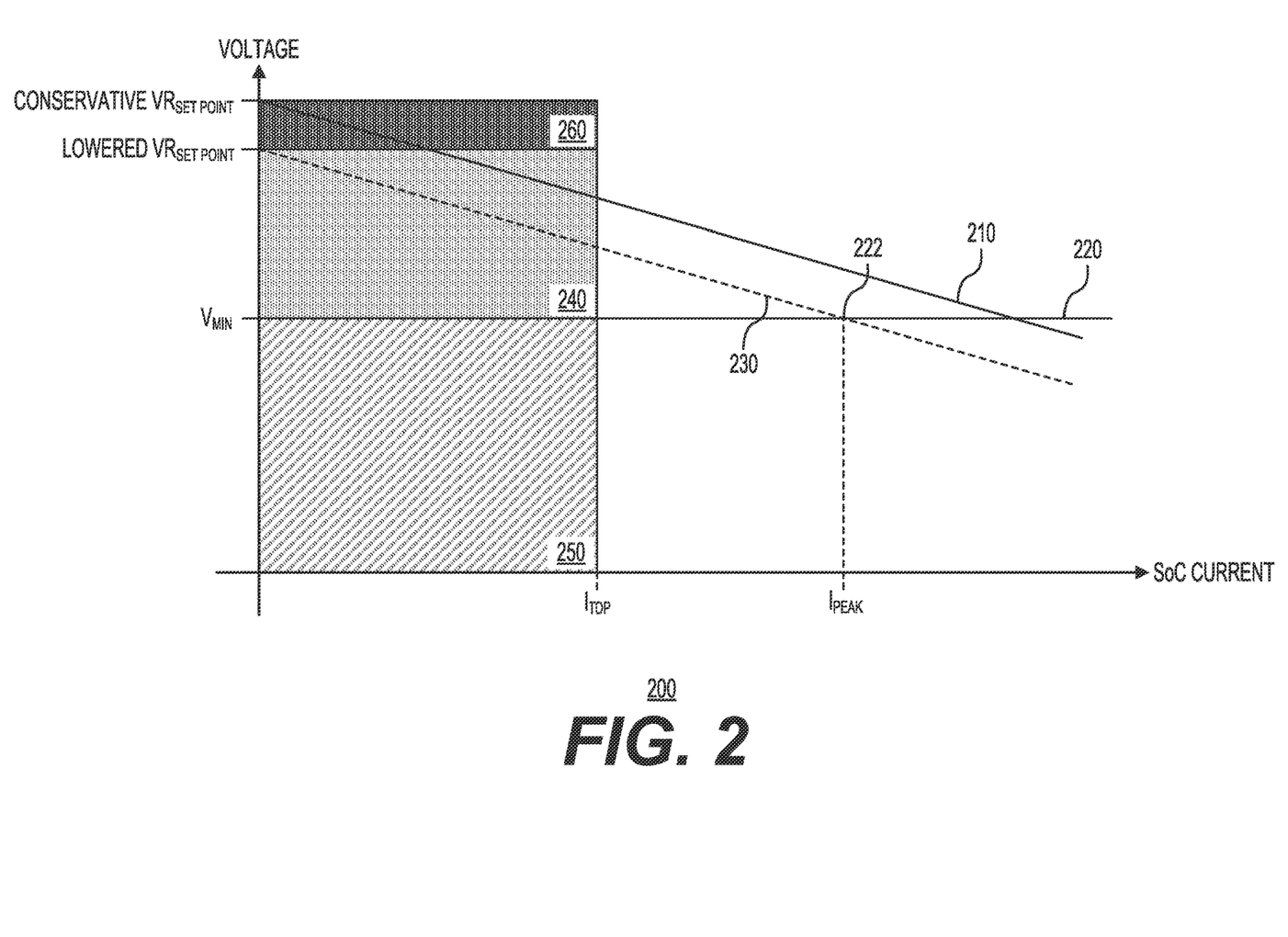
FIG. 2 shows a diagram illustrating saved power when the voltage regulator set point ($VR_{SET\ POINT}$) is set at a lowered $VR_{SET\ POINT}$ compared with the conservative $VR_{SET\ POINT}$ in accordance with one example.

FIG. 2 shows a diagram 200 illustrating saved power when the voltage regulator set point ($VR_{SET\ POINT}$) is set at a lowered $VR_{SET\ POINT}$ compared with the conservative $VR_{SET\ POINT}$. Like diagram 100, in this diagram 200, the vertical axis represents voltage and the horizontal axis represents current (e.g., the current being drawn by a system on chip (SoC)). In this example, curve 210 represents the input voltage to the regulator (e.g., a low-dropout (LDO) regulator) and curve 220 represents the output voltage of the regulator (e.g., an LDO regulator). In this example, similar to as described with respect to FIG. 1, $I_{TDP}$ corresponds to the current drawn by the SoC at the thermal design power point. This current corresponds to the maximum amount of current that the SoC may draw given cooling constraints related to the heating of the SoC with an increased amount of current draw. In this example, $I_{PEAK}$ corresponds to the peak current that the SoC may draw. As shown in diagram 200, as the current drawn by the SoC increases, the output voltage of the regulator (represented by curve 220) drops. In this example, the voltage regulator set point does not guarantee that the output voltage of the regulator never drops below the minimum voltage ($V_{MIN}$) required at the peak current ($I_{PEAK}$).

With continued reference to FIG. 2, unlike the regulator configuration where curve 110 (corresponding to the input voltage of the regulator) and curve 120 (corresponding to the output voltage of the regulator) intersect at point 122, in this regulator configuration curve 230 (corresponding to the reduced input voltage of the regulator) and curve 220 (corresponding to the output voltage of the regulator) intersect at point 222. This means that the headroom (the difference between the input voltage of the regulator and the output voltage of the regulator) is guaranteed to be equal to or greater (e.g., by a few millivolts) than zero at point 222. The headroom set up per diagram 200, however, results in a reduced power loss 240 relative to actual compute power 250 used by the SoC. This advantageously results in saved power 260. In the present disclosure the lowered $VR_{SET\ POINT}$ compared with the conservative $VR_{SET\ POINT}$ is adjusted to dynamically reduce the SoC voltage below the conservative $VR_{SET\ POINT}$ (e.g., a set point that corresponds to worst case current draw conditions). By monitoring the actual short-term average SoC current, a less conservative voltage regulator set point is used that is sufficient for an optimal performance operation of the SoC in normal operating conditions. In rare cases, when the reduced VR set point (e.g., the lowered $VR_{SET\ POINT}$ shown in FIG. 2) is insufficient, a distributed droop mitigation mechanism and an adaptive clocking mechanism are used to prevent a failure due to the voltage droop.

Figure 3:
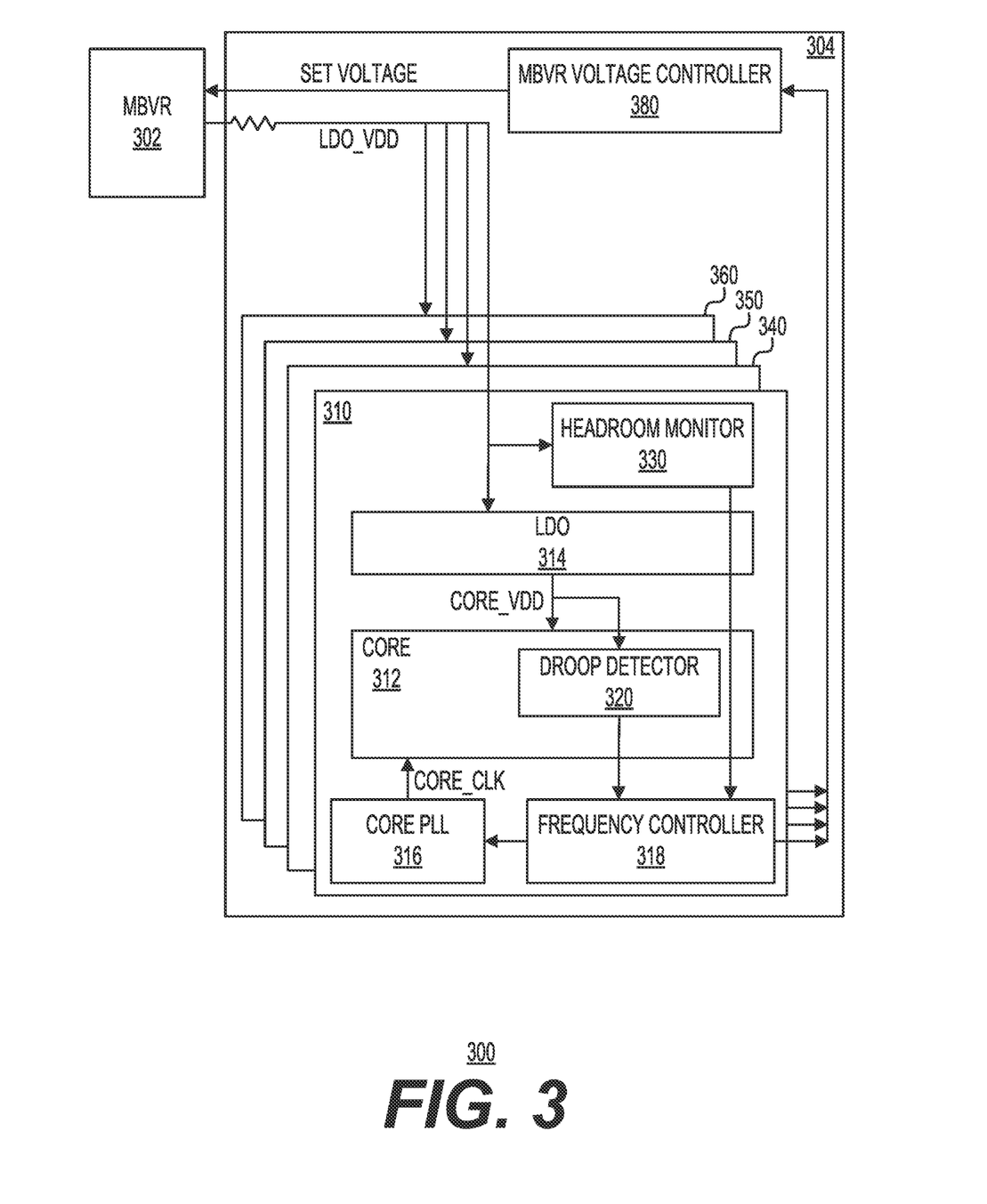
FIG. 3 shows a block diagram of a system including various components for implementing adaptive voltage headroom control in accordance with one example.

FIG. 3 shows a block diagram of a system 300 including various components for implementing adaptive voltage headroom control in accordance with one example. System 300 may include a motherboard voltage regulator (MBVR 302) coupled to a system on chip (SoC) 304. MBVR 302 may be a voltage regulator configured to provide voltage to multiple voltage regulators (e.g., low-dropout (LDO) regulators associated with various processing units of SoC 304). In this example, MBVR 302 may be configured to provide LDO_VDD as input voltage to the various LDOs included as part of SoC 304.

With continued reference to FIG. 3, SoC 304 may include multiple processing units (e.g., central processing units (CPUs) or portions thereof), including for example processing unit 310, 340, 350, and 360. In this example, each processing unit may include a core. As an example, processing unit 310 may include a core 312. Each core may have a corresponding LDO. As an example, core 312 may have a corresponding LDO 314 configured to provide CORE_VDD as the input voltage to core 312. Each core may further have a corresponding core phase locked loop (PLL) and a frequency controller associated with the core PLL. As an example, core 312 may have a corresponding core PLL 316 and a corresponding frequency controller 318. Each core may also have a corresponding droop detector and a headroom monitor. As an example, core 312 may have a corresponding droop detector 320 and a corresponding headroom monitor 330.

Still referring to FIG. 3, core PLL 316 may be implemented as a phase-locked loop configured to output a clock signal (e.g., CORE_CLK signal) for core 312. Core PLL 316 may provide functionality associated with PLLs used for clocking cores, including clock division or multiplication, and using a feedback loop to ensure that the output clock is in close alignment with a reference clock. Frequency controller 318 may include dynamic voltage frequency (DVFS) control logic. DVFS control logic may be configured to receive an output from droop detector 320 indicating detection of the droop and dynamically compensate for the detected droop. In one example, the DVFS control logic corresponding to frequency controller 318 may operate pursuant to a core voltage ID that corresponds to the frequency at which the core needs to operate at. Since the core can operate at different frequencies, there may be multiple core voltage IDs corresponding to the different clock frequencies. The DVFS control logic may also track an adaptive voltage clock ID per core. For a given core voltage ID, the adaptive voltage clock ID corresponds to a voltage that is within a selected delta of the voltage specified by the core voltage ID. The delta itself may be set to be only a few millivolts. Droop detector 320 may be configured to detect the difference between the voltage corresponding to a given core voltage ID and a corresponding adaptive voltage clock ID. A difference that meets or exceed a threshold may result in a droop detect event.

Figure 4:
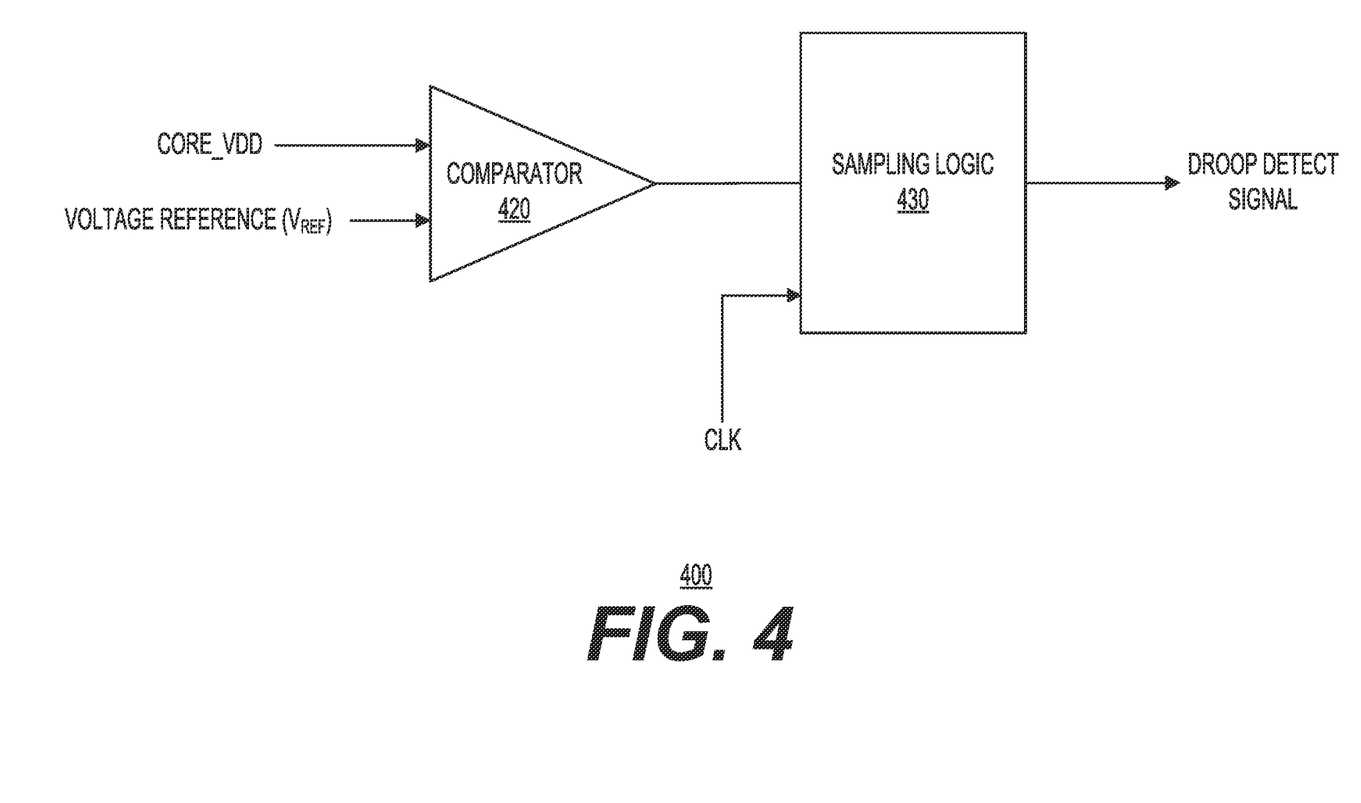
FIG. 4 shows a block diagram of a droop detector for use with the system of FIG. 3 in accordance with one example.

Referring now to FIG. 4, a block diagram of a droop detector 400 for use with the system of FIG. 3 in accordance with one example. Droop detector 400 may be configured to compare the core voltage (e.g., CORE_VDD) with a voltage reference ($V_{REF}$). The voltage reference may relate to a voltage that can be compared with the core voltage to determine the amount of droop. The voltage reference may be generated by converting a digital value into an analog value using a digital to analog converter (DAC). As explained earlier, the voltage reference may be a voltage that corresponds to an adaptive clock ID and the core voltage may be a voltage that corresponds to a core voltage ID. Comparator 420 may compare the two voltages and generate a signal that could be sampled using sampling logic 430. Sampling logic 430 may be clocked, allowing for sampling of the comparator output over several clock cycles, as needed. Based on the sampled output from comparator 420, a droop detect signal is generated by droop detector 400. As explained earlier, frequency controller 318 of FIG. 3 may receive the droop detect signals and respond to these signals. Although FIG. 4 shows droop detector 400 as including a certain number of components arranged in a certain manner, droop detector 400 may include additional or fewer components arranged differently.

Referring back to FIG. 3, each core may further include a headroom monitor per LDO. As an example, FIG. 3 shows a headroom monitor 330 for LDO 314. As described earlier, the headroom refers to the difference between the input voltage of the regulator (e.g., LDO 314) and the output voltage of the regulator. Headroom monitor 330 may be configured to detect the difference between the input voltage (e.g., LDO_VDD) and the output voltage of the LDO (e.g., CORE_VDD). Headroom monitor 330 may be configured such that when the difference between the input voltage to the LDO and the output voltage of the LDO equals or falls below a threshold (e.g., a threshold of a few millivolts), then a signal indicating a headroom event is generated. Headroom event signals may be provided to frequency controller 318 and to MBVR voltage controller 380. Frequency controller 318 can respond to headroom event signals independently of the droop detection by the droop detector and vice-versa. As an example, once a headroom event signal is generated, adaptive control related actions may be taken by frequency controller 318. In one example, any violation of the headroom may result in a change to the clock frequency, a change to the core voltage, or another remedial action.

Figure 5:
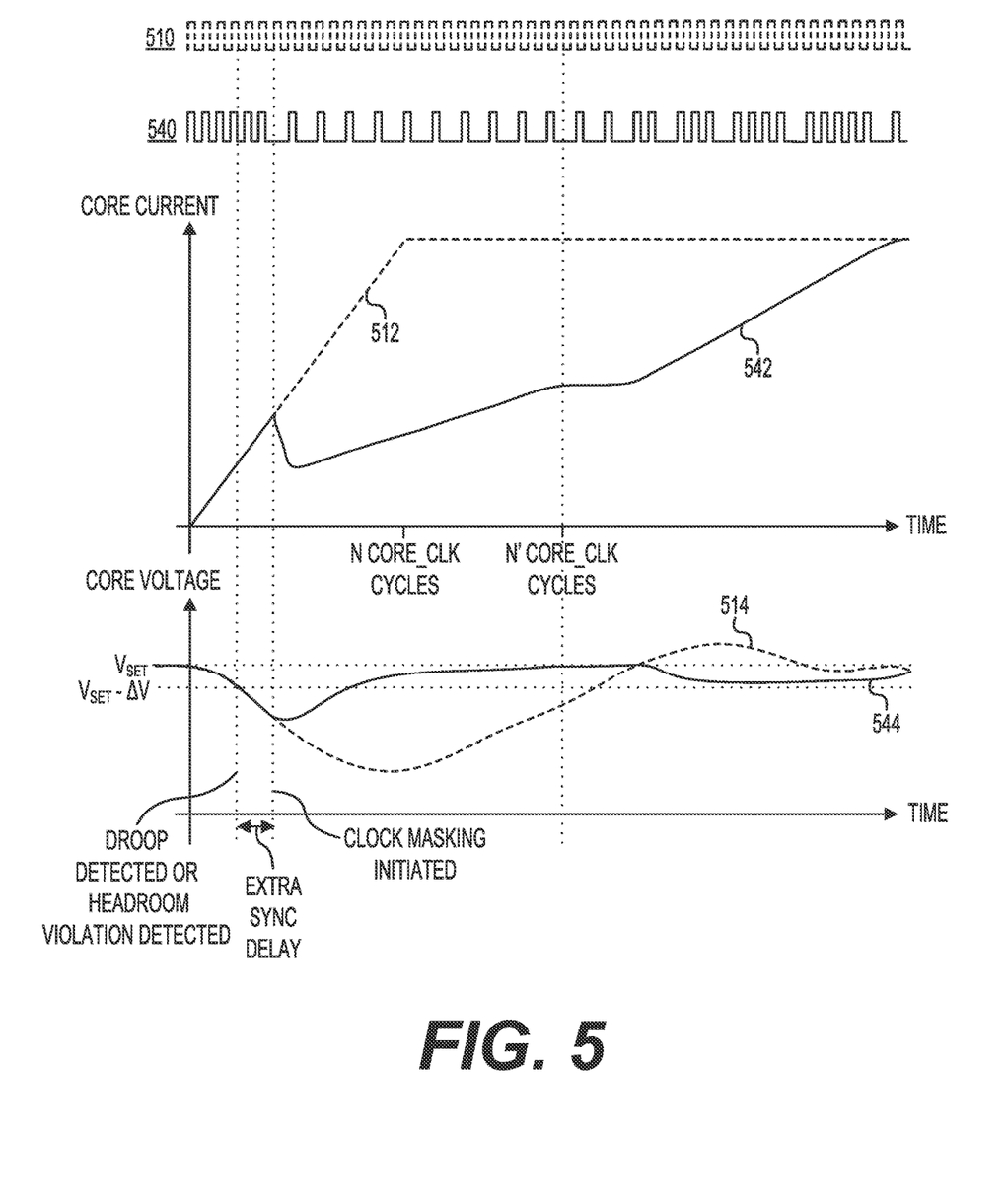
FIG. 5 illustrates the effect of adaptive clocking in accordance with one example.

FIG. 5 illustrates the effect of adaptive clocking in accordance with one example. As explained earlier, system 300 is configured to implement adaptive clocking per core in response to either headroom event signals or droop detect signals independently of each other. In one example, the fast response aspect of the adaptive voltage headroom response mechanism may be implemented as a combination of frequency controller 318 and headroom monitor 330. In one example, the droop response mechanism may be implemented as a combination of frequency controller 318 and droop detector 320. In this example, the control apparatus may reduce the core clock frequency by a certain percentage of the operating frequency by masking alternate high phases of the core clock. This helps stop the droop and recover the core voltage because reducing the effective clock frequency reduces current draw. The control apparatus may continue to mask the core clock, allowing the core voltage to recover. When the voltage is fully recovered, the control apparatus may restore core performance by ramping the frequency back to the original value. The frequency recovery process may be performed in a graceful fashion by gradually increasing the number of high phases that are unmasked, thereby avoiding any subsequent droops. Moreover, the frequency drop and recovery could be performed using other mechanisms.

With continued reference to FIG. 5, waveform 510 shows the core clock signal without adaptive clocking (e.g., without the effect of the adaptive voltage headroom response mechanism or the droop response mechanism). Waveform 540 shows the core clock signal with adaptive clocking. Waveform 540 shows the effect of masking of the core clock signal in response to the detection of droop. Curve 512 shows the core current without adaptive clocking and curve 514 shows the core voltage without adaptive clocking. As shown in FIG. 5, without adaptive clocking, after N core clock cycles, the core current maximizes and does not rise any further. In case of a droop event (e.g., when the voltage changes from $V_{SET}$ to $V_{SET}-\Delta V$), in the absence of adaptive clocking, the core voltage falls and does not recover until later. Curve 542 shows the core current with adaptive clocking and curve 544 shows the core voltage with adaptive clocking. As shown in FIG. 5, once the droop is detected (at time DROOP DETECTED in FIG. 5) after an extra synchronization delay (EXTRA SYNC DELAY in FIG. 5) clock masking is initiated (at time CLOCK MASKING INITIATED in FIG. 5). In one example, clock masking is implemented by frequency controller 318 of FIG. 3 by applying a mask to selected high phases of the core clock signal. An application of the mask (e.g., a mask 11111010101010 . . . ) results in waveform 540, which corresponds to the core clock signal with adaptive clocking. As shown in FIG. 5, the masking is used in a manner that the clock recovery is graceful and not abrupt. As an example, to ensure graceful response the mask is selected in a manner that the core current increases gradually (e.g., as shown by curve 542 in FIG. 5). The mask ensures that initially only some of the high phases of the clock signal are unmasked and the number of the high phases of the clock signal that are unmasked is increased slowly. As an example, after N' core clock cycles, the high phases of the clock signal are unmasked in a controlled and gradual manner. This prevents further droop that could occur when the current increases quickly (e.g., as shown by curve 514 in response to a sharp increase in current as shown by curve 512).

Referring back to FIG. 3, SoC 304 may further include an MBVR voltage controller 380. The MBVR voltage controller 380 may be configured to keep count of each of droop events and headroom violation events within a certain window of time. If the number of droop events and/or the headroom violation events exceeds a set threshold (each type of event may have a different threshold), then it provides the MBVR voltage controller 380 an indication that the current performance level is not sustainable by the power delivery configuration. Consecutive droops impact the performance negatively as each droop event results in lowering the frequency by a selected percentage. The MBVR voltage controller 380 continues to monitor and keep track of the droop events or headroom violation events and may respond in two ways: (1) lower core clock frequency by small amounts (by 2-5 percentage of the operating frequency) for a certain duration, and/or (2) raise on-die and/or off-die voltage regulator output voltage to increase the voltage headroom to reduce the likelihood of another droop event or a headroom violation event from occurring.

By lowering the frequency and monitoring the droop behavior after lowering the frequency, the adaptive voltage headroom control apparatus finds the maximum sustained performance level without incurring additional droop events that cause loss of performance. The adaptive voltage headroom control apparatus can also use the knowledge to adapt to that setting. By increasing the input voltage, the adaptive voltage headroom control apparatus can provide additional voltage margin to sustain the higher rate of change of current. This reduces the performance impact due to reducing the clock frequency because of voltage droops. Once the system has operated in this state for a set duration, the adaptive voltage headroom control apparatus attempts to restore the energy efficiency of the system by raising the frequency or lowering the headroom for the voltage regulators. Although FIG. 3 shows system 300 as including a certain number of components arranged and coupled in a certain way, system 300 may include fewer or additional components arranged and coupled differently.

Figure 6:
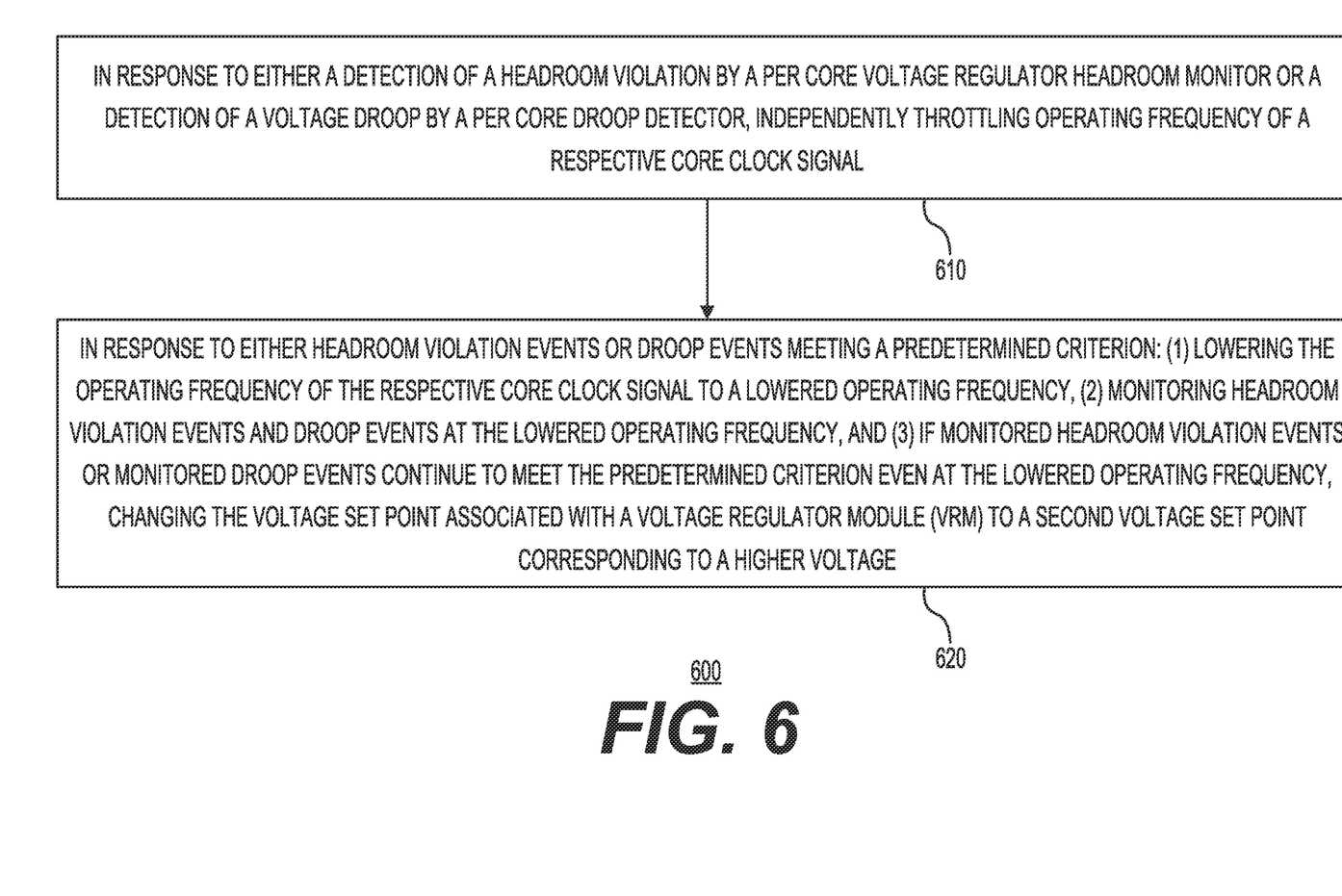
FIG. 6 shows a flow chart of a method for adaptively controlling voltage headroom for a system in accordance with one example.

FIG. 6 shows a flow chart 600 of a method for adaptively controlling voltage headroom in accordance with one example. In this example, the method corresponding to flow chart 600 may be performed as part of a system including: (1) a system-on-chip (SoC) including a plurality of cores, and (2) a voltage regulator module (VRM), based on a voltage set point associated with the VRM, configured to provide an input voltage to each of per core voltage regulators in the SoC, where each of the per core voltage regulators is configured to provide an output voltage to a corresponding core from among the plurality of cores. In one example, this method may be performed using various components of system 300 of FIG. 3. MBVR 302 of FIG. 3 may perform the function of a voltage regulator module (VRM) and provide an input voltage to the SoC. Step 610 may include in response to either a detection of a headroom violation by a per core voltage regulator headroom monitor or a detection of a voltage droop by a per core droop detector, independently throttle operating frequency of a respective core clock signal. As part of this step, as explained earlier with respect to FIGS. 3-5, a headroom monitor (e.g., headroom monitor 330 of FIG. 3) may detect headroom violations. In addition, as part of this step, as explained earlier with respect to FIGS. 3-5, a droop detector (e.g., droop detector 320 of FIG. 3) may detect a voltage droop. As described with respect to FIG. 3, system 300 includes per core headroom monitors and per core droop detectors.

With continued reference to FIG. 6, step 620 may include in response to either headroom violation events or droop events meeting a predetermined criterion: (1) lowering the operating frequency of the respective core clock signal to a lowered operating frequency, (2) monitoring headroom violation events and droop events at the lowered operating frequency, and (3) if monitored headroom violation events or monitored droop events continue to meet the predetermined criterion even at the lowered operating frequency, changing the voltage set point associated with the VRM to a second voltage set point corresponding to a higher voltage. As explained earlier, the adaptive headroom voltage control apparatus, including MBVR voltage controller 380 of FIG. 3 may be configured to set the voltage setpoint of the voltage regulator module (e.g., MBVR 302 of FIG. 3) and perform these steps. As an example, the MBVR voltage controller

380 of FIG. 3 may keep count of each of droop events and headroom violation events within a certain window of time. If the number of droop events and/or the headroom violation events exceeds a set threshold (each type of event may have a different threshold), then it provides the MBVR voltage controller 380 an indication that the current performance level is not sustainable by the power delivery configuration. Moreover, as explained earlier with respect to FIGS. 3-5, the adaptive headroom voltage control apparatus, including MBVR voltage controller 380 may change the voltage set point associated with the voltage regulator module (e.g., MBVR 302 of FIG. 3). Although FIG. 6 shows a certain number of steps performed in a certain order, additional or fewer steps in a different order may be performed as part of flow chart 600.

In conclusion, the present disclosure relates to a system including a system-on-chip (SoC) including a plurality of cores. The system may further include a voltage regulator module (VRM), which is based on a voltage set point associated with the VRM, configured to provide an input voltage to each of per core voltage regulators in the SoC, where each of the per core voltage regulators is configured to provide an output voltage to a corresponding core from among the plurality of cores. The system may further include an adaptive voltage headroom control apparatus including: (1) a voltage controller for controlling the voltage set point associated with the VRM, (2) a per core voltage regulator headroom monitor, (3) a per core droop detector, and (4) a per core frequency controller configured to control a frequency of a core clock signal for a respective core from among the plurality of cores.

The adaptive voltage headroom control apparatus may be configured to, in response to either a detection of a headroom violation by the per core voltage regulator headroom monitor or a detection of a voltage droop by the per core droop detector, independently throttle operating frequency of a respective core clock signal. The adaptive voltage headroom control apparatus may further be configured to in response to either headroom violation events or droop events meeting a predetermined criterion: (1) lower the operating frequency of the respective core clock signal to a lowered operating frequency, (2) monitor headroom violation events and droop events at the lowered operating frequency, and (3) if monitored headroom violation events or monitored droop events continue to meet the predetermined criterion even at the lowered operating frequency, change the voltage set point associated with the VRM to a second voltage set point corresponding to a higher voltage.

Each of the per core voltage regulators may comprise a low-dropout (LDO) regulator, and the headroom violation event may correspond to a headroom violation associated with a respective LDO regulator. Each of the per core voltage regulators may comprise a low-dropout (LDO) regulator, and the voltage droop event may correspond to a droop associated with an output voltage of a respective LDO regulator.

The adaptive voltage headroom control apparatus may be configured to independently throttle frequency of the respective core clock signal by masking the respective core clock signal. The adaptive voltage headroom control apparatus may further be configured to, having operated the system for a predetermined duration after changing the voltage set point associated with the VRM to the second voltage setpoint associated with the VRM, raise an operating frequency of one or more respective core clock signals.

The adaptive voltage headroom control apparatus may further be configured to, having operated the system for a predetermined duration after changing the voltage set point associated with the VRM to the second voltage setpoint associated with the VRM, lower a headroom associated with one or more per core voltage regulators. The per core frequency controller may further be configured to monitor a respective core voltage and ramp up throttled operating frequency of a respective core clock signal to an original frequency once the respective core voltage has recovered from the voltage droop.

In another example, the present disclosure relates to a method for adaptively controlling voltage headroom for a system comprising: (1) a system-on-chip (SoC) including a plurality of cores, and (2) a voltage regulator module (VRM), which is based on a voltage set point associated with the VRM, configured to provide an input voltage to each of per core voltage regulators in the SoC, where each of the per core voltage regulators is configured to provide an output voltage to a corresponding core from among the plurality of cores. The method may include, in response to either a detection of a headroom violation by a per core voltage regulator headroom monitor or a detection of a voltage droop by a per core droop detector, independently throttle operating frequency of a respective core clock signal.

The method may further include, in response to either headroom violation events or droop events meeting a predetermined criterion: (1) lowering the operating frequency of the respective core clock signal to a lowered operating frequency, (2) monitoring headroom violation events and droop events at the lowered operating frequency, and (3) if monitored headroom violation events or monitored droop events continue to meet the predetermined criterion even at the lowered operating frequency, changing the voltage set point associated with the VRM to a second voltage set point corresponding to a higher voltage.

Each of the per core voltage regulators may comprise a low-dropout (LDO) regulator, and the headroom violation event may correspond to a headroom violation associated with a respective LDO regulator. Each of the per core voltage regulators may comprise a low-dropout (LDO) regulator, and the voltage droop event may correspond to a droop associated with an output voltage of a respective LDO regulator.

Independently throttling frequency of the respective core clock signal may comprise masking the respective core clock signal. The method may further comprise, having operated the system for a predetermined duration after changing the voltage set point associated with the VRM to the second voltage setpoint associated with the VRM, raising an operating frequency of one or more respective core clock signals. The method may further comprise, having operated the system for a predetermined duration after changing the voltage set point associated with the VRM to the second voltage setpoint associated with the VRM, lowering a headroom associated with one or more per core voltage regulators. The method may further comprise monitoring a respective core voltage and ramping up throttled operating frequency of a respective core clock signal to an original frequency once the respective core voltage has recovered from the voltage droop.

In yet another example, the present disclosure relates to a system including a system-on-chip (SoC) including a plurality of cores. The system may further include a voltage regulator module (VRM), which is based on a voltage set point associated with the VRM, configured to provide an input voltage to each of per core low-dropout (LDO) voltage regulators in the SoC, where each of the per core LDO voltage regulators is configured to provide an output voltage to a corresponding core from among the plurality of cores. The system may further include an adaptive voltage headroom control apparatus including: (1) a voltage controller for controlling the voltage set point associated with the VRM, (2) a per core LDO voltage regulator headroom monitor, (3) a per core droop detector, and (4) a per core frequency controller configured to control a frequency of a core clock signal for a respective core from among the plurality of cores.

The adaptive voltage headroom control apparatus may be configured to, in response to either a detection of a headroom violation by the per core LDO voltage regulator headroom monitor or a detection of a voltage droop by the per core droop detector, independently throttle operating frequency of a respective core clock signal. The adaptive voltage headroom control apparatus may further be configured to in response to either headroom violation events or droop events meeting a predetermined criterion: (1) lower the operating frequency of the respective core clock signal to a lowered operating frequency, (2) monitor headroom violation events and droop events at the lowered operating frequency, and (3) if monitored headroom violation events or monitored droop events continue to meet the predetermined criterion even at the lowered operating frequency, change the voltage set point associated with the VRM to a second voltage set point corresponding to a higher voltage.

The headroom violation event may correspond to a headroom violation associated with a respective LDO regulator. The voltage droop event may correspond to a droop associated with an output voltage of a respective LDO regulator. The adaptive voltage headroom control apparatus may further be configured to independently throttle frequency of the respective core clock signal by masking the respective core clock signal.

The adaptive voltage headroom control apparatus may further be configured to, having operated the system for a predetermined duration after changing the voltage set point associated with the VRM to the second voltage setpoint associated with the VRM, raise an operating frequency of one or more respective core clock signals. The adaptive voltage headroom control apparatus may further be configured to, having operated the system for a predetermined duration after changing the voltage set point associated with the VRM to the second voltage setpoint associated with the VRM, lower a headroom associated with one or more per core LDO voltage regulators.

It is to be understood that the systems, services, devices, methods, terminals, and components described herein are merely examples. Alternatively, or in addition, the functionality described herein can be performed, at least in part, by one or more hardware logic components. For example, illustrative types of hardware logic components that can be used include FPGAs, ASICs, Application-Specific Standard Products (ASSPs), System-on-a-Chip systems (SoCs), Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with, transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
a system-on-chip (SoC) including a plurality of cores;
a voltage regulator module (VRM), based on a voltage set point associated with the VRM, configured to provide an input voltage to each of per core voltage regulators in the SoC, wherein each of the per core voltage regulators is configured to provide an output voltage to a corresponding core from among the plurality of cores; and
an adaptive voltage control apparatus including: (1) a voltage controller for controlling the voltage set point associated with the VRM, (2) a per core droop detector, and (3) a per core frequency controller configured to control a frequency of a core clock signal for a respective core from among the plurality of cores, wherein the adaptive voltage control apparatus is configured to:
in response to a detection of a voltage droop by the per core droop detector, independently throttle operating frequency of a respective core clock signal, and
in response to droop events meeting a predetermined criterion: (1) lower the operating frequency of the respective core clock signal to a lowered operating frequency, (2) monitor droop events at the lowered operating frequency, and (3) if the monitored droop events at the lowered operating frequency continue to meet the predetermined criterion, change the voltage set point associated with the VRM to a second voltage set point corresponding to a higher voltage.

2. The system of claim 1, wherein each of the per core voltage regulators comprises a low-dropout (LDO) regulator, and wherein the droop event corresponds to a droop associated with an output voltage of a respective LDO regulator.

3. The system of claim 1, wherein the per core frequency controller is further configured to monitor a respective core voltage and ramp up throttled operating frequency of a respective core clock signal to an original frequency once the respective core voltage has recovered from the voltage droop.

4. The system of claim 1, wherein the adaptive voltage control apparatus is configured to independently throttle frequency of the respective core clock signal by masking the respective core clock signal.

5. The system of claim 1, wherein the adaptive voltage control apparatus is further configured to, having operated the system for a predetermined duration after changing the voltage set point associated with the VRM to the second voltage setpoint associated with the VRM, raise an operating frequency of one or more respective core clock signals.

6. The system of claim 1, wherein the adaptive voltage control apparatus further comprises a headroom monitor configured to, in response to headroom events meeting a second predetermined criterion: (1) independently throttle operating frequency of the respective core clock signal to a second lowered operating frequency, (2) monitor headroom violation events at the second lowered operating frequency, (3) if the monitored headroom violation events at the second lowered operating frequency continue to meet the second predetermined criterion, change the voltage set point associated with the VRM.

7. The system of claim 6, wherein the adaptive voltage control apparatus is further configured to, having operated the system for a predetermined duration after changing the voltage set point associated with the VRM, lower a headroom associated with one or more per core voltage regulators.

8. A method for adaptively controlling voltage for a system including: (1) a system-on-chip (SoC) including a plurality of cores, and (2) a voltage regulator module (VRM), based on a voltage set point associated with the VRM, configured to provide an input voltage to each of per core voltage regulators in the SoC, wherein each of the per core voltage regulators is configured to provide an output voltage to a corresponding core from among the plurality of cores, the method comprising:
in response to a detection of a voltage droop by a per core droop detector, independently throttle operating frequency of a respective core clock signal; and
in response to droop events meeting a first predetermined criterion: (1) lowering the operating frequency of the respective core clock signal to a lowered operating frequency, (2) monitoring droop events at the lowered operating frequency, and (3) if the monitored droop events at the lowered operating frequency continue to meet the first predetermined criterion, changing the voltage set point associated with the VRM to a second voltage set point corresponding to a higher voltage.

9. The method of claim 8, wherein each of the per core voltage regulators comprises a low-dropout (LDO) regulator, and wherein the droop event corresponds to a droop associated with an output voltage of a respective LDO regulator.

10. The method of claim 8, further comprising monitoring a respective core voltage and ramping up throttled operating frequency of a respective core clock signal to an original frequency once the respective core voltage has recovered from the voltage droop.

11. The method of claim 8, wherein independently throttling frequency of the respective core clock signal comprises masking the respective core clock signal.

12. The method of claim 8, further comprising, having operated the system for a predetermined duration after changing the voltage set point associated with the VRM to the second voltage setpoint associated with the VRM, raising an operating frequency of one or more respective core clock signals.

13. The method of claim 8, wherein the adaptive voltage control apparatus further comprises a headroom monitor, and wherein the method further comprises, in response to headroom events meeting a second predetermined criterion: (1) independently throttling operating frequency of the respective core clock signal to a second lowered operating frequency, (2) monitoring headroom violation events at the second lowered operating frequency, (3) if the monitored headroom violation events at the second lowered operating frequency continue to meet the second predetermined criterion, changing the voltage set point associated with the VRM.

14. The method of claim 13, further comprising, having operated the system for a predetermined duration after changing the voltage set point associated with the VRM, lowering a headroom associated with one or more per core voltage regulators.

15. A system comprising:
a system-on-chip (SoC) including a plurality of cores;
a voltage regulator module (VRM), based on a voltage set point associated with the VRM, configured to provide an input voltage to each of per core low-dropout (LDO) voltage regulators in the SoC, wherein each of the per core LDO voltage regulators is configured to provide an output voltage to a corresponding core from among the plurality of cores; and an adaptive voltage control apparatus including: (1) a voltage controller for controlling the voltage set point associated with the VRM, (2) a per core droop detector, and (3) a per core frequency controller configured to control a frequency of a core clock signal for a respective core from among the plurality of cores, wherein the adaptive voltage control apparatus is configured to:

in response to a detection of a voltage droop by the per core droop detector, independently throttle operating frequency of a respective core clock signal, and in response to droop events meeting a predetermined criterion: (1) lower the operating frequency of the respective core clock signal to a lowered operating frequency, (2) monitor droop events at the lowered operating frequency, and (3) if the monitored droop events at the lowered operating frequency continue to meet the predetermined criterion, change the voltage set point associated with the VRM to a second voltage set point corresponding to a higher voltage.

16. The system of claim 15, wherein the per core frequency controller is further configured to monitor a respective core voltage and ramp up throttled operating frequency of a respective core clock signal to an original frequency once the respective core voltage has recovered from the voltage droop.

17. The system of claim 15, wherein the adaptive voltage control apparatus is configured to independently throttle frequency of the respective core clock signal by masking the respective core clock signal.

18. The system of claim 15, wherein the adaptive voltage control apparatus is further configured to, having operated the system for a predetermined duration after changing the voltage set point associated with the VRM to the second voltage setpoint associated with the VRM, raise an operating frequency of one or more respective core clock signals.

19. The system of claim 15, wherein the adaptive voltage control apparatus further comprises a headroom monitor configured to, in response to headroom events meeting a second predetermined criterion: (1) independently throttle operating frequency of the respective core clock signal to a second lowered operating frequency, (2) monitor headroom violation events at the second lowered operating frequency, (3) if monitored headroom violation events at the second lowered operating frequency continue to meet the second predetermined criterion, change the voltage set point associated with the VRM.

20. The system of claim 19, wherein the adaptive voltage control apparatus is further configured to, having operated the system for a predetermined duration after changing the voltage set point associated with the VRM, lower a headroom associated with one or more per core LDO voltage regulators.

* * * * *